US008374492B2

(12) United States Patent
Le Meur et al.

(10) Patent No.: US 8,374,492 B2
(45) Date of Patent: Feb. 12, 2013

(54) METHOD AND DEVICE FOR CALCULATING THE SALIENCE OF AN AUDIO VIDEO DOCUMENT

(75) Inventors: Olivier Le Meur, Talensac (FR); Alexandre Ninassi, Osse (FR); Jean-Claude Chevet, Betton (FR)

(73) Assignee: Thomson Licensing, Issy-les-Moulineaux (FR)

( * ) Notice: Subject to any disclaimer, the term of this patent is extended or adjusted under 35 U.S.C. 154(b) by 1045 days.

(21) Appl. No.: 12/316,002

(22) Filed: Feb. 4, 2009

(65) Prior Publication Data
US 2009/0175595 A1 Jul. 9, 2009

(30) Foreign Application Priority Data

Dec. 20, 2007 (FR) ...................................... 07 60122

(51) Int. Cl.
*H04N 5/93* (2006.01)
(52) U.S. Cl. ...................................... 386/285; 386/338
(58) Field of Classification Search .................... None
See application file for complete search history.

(56) References Cited

U.S. PATENT DOCUMENTS

| 2004/0088726 | A1 | 5/2004 | Ma et al. | |
|---|---|---|---|---|
| 2005/0078172 | A1* | 4/2005 | Harville et al. | 348/14.09 |
| 2005/0141728 | A1* | 6/2005 | Moorer | 381/61 |
| 2006/0233442 | A1* | 10/2006 | Lu et al. | 382/190 |

FOREIGN PATENT DOCUMENTS

| CN | 1452851 | 10/2003 |
|---|---|---|
| EP | 1936566 | 6/2008 |
| WO | WO0182651 | 11/2001 |
| WO | WO 2004/043054 | 5/2004 |

OTHER PUBLICATIONS

Cynthia Breazeal et al: "Active Vision for Social Robots", Sep. 1, 2001, IEEE Transactions on Systems, Man and Cybernetics. Part A: Systems and Humans, IEEE Service Center, Piscataway, NJ, US, XP011056411 ISSN: 1083-4427, p. 452, alinea 12-p. 452.
Selim Onat et al: "Integrating Audiovisual Information for the Control of Overt Attention", Journal of Vision, (Online), vol. 7. No. 10, Jul. 25, 2007, pp. 1-16, XP002491583, issn:1534-7362, Extrait de l'Internet: URL:http://www.journalofvision.org/7/10/11/article. aspx> [Extrait le Aug. 7, 2008] *le document en entier*.
Search Report dated Aug. 8, 2008.

* cited by examiner

*Primary Examiner* — Huy T Nguyen
(74) *Attorney, Agent, or Firm* — Myers Wolin, LLC

(57) ABSTRACT

The invention relates to a method for determining the salience map of an audio video document. The method comprises the steps for:
   calculating a salience map in relation to the video part of said document,
   determining at least one audio descriptor representing said document,
   weighting the video salience map as a function of the variation of said audio descriptor.

8 Claims, 4 Drawing Sheets

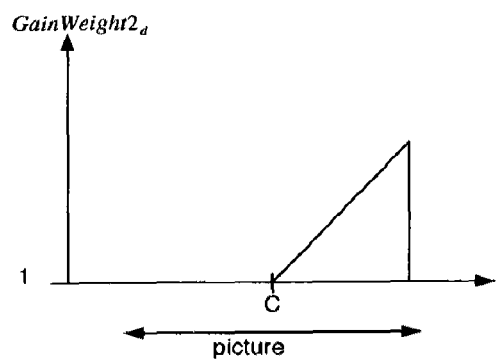
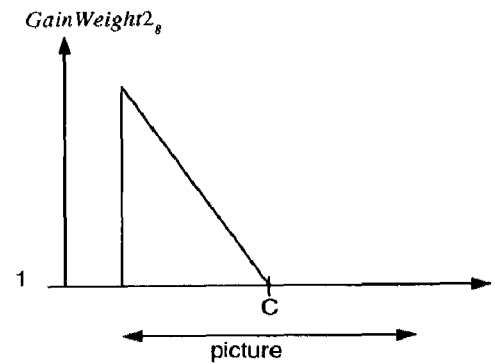
Fig 4a
Fig 4b
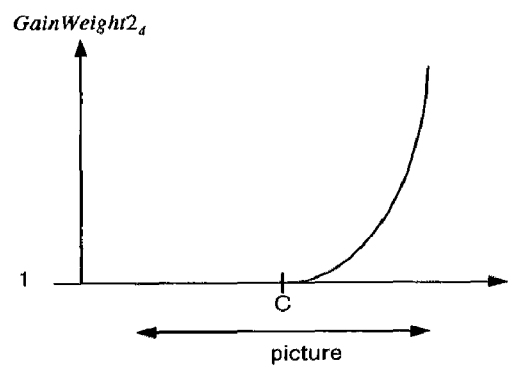
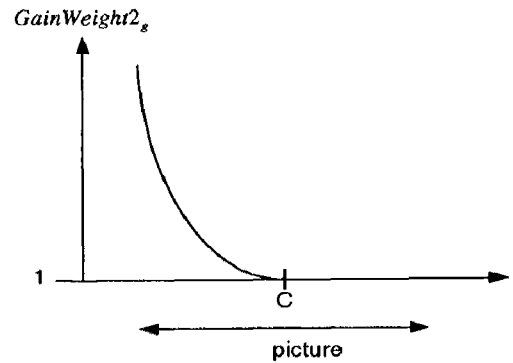
Fig 5a
Fig 5b
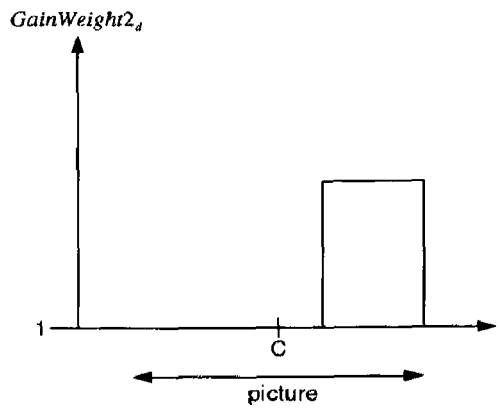
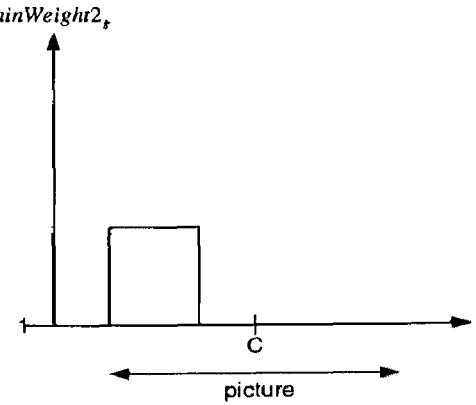
Fig 6a
Fig 6b

METHOD AND DEVICE FOR CALCULATING THE SALIENCE OF AN AUDIO VIDEO DOCUMENT

FIELD OF THE INVENTION

The invention relates to a device and method for calculating a salience map of an audio video document.

This application claims the benefit, under 35 U.S.C. §119, of European Patent Application No. 0760122 of 20 Dec. 2007.

BACKGROUND OF THE INVENTION

The invention relates more particularly to the recognition of the audio characteristics for determining the salient of an audio video document.

The determination of the salient zones of an audio video document is useful for different applications such as compression (the salient zones are coded on a greater number of bits for example or the quantization step for said zone is modified), indexing (it is possible to index the documents by using the information in these salient zones), etc.

There are several methods for determining the salience of a video document. The European patent EP1695288 filed in the name of Thomson Licensing on 14 Dec. 2004 describes a particularly effective method for establishing the salience map of a video document.

However, in some cases, the video does not enable the salience of an audio video document to be obtained in sufficiently accurate manner.

To improve the relevance of current methods, the invention proposes to associate audio characteristics with the visual characteristics.

SUMMARY OF THE INVENTION

For this purpose, the invention proposes a method for determining the salience map of an audio video document characterized in that it comprises the steps for:
calculating a salience map in relation to the video part of the document,
determining at least one audio descriptor representing the document,
weighting the video salience map as a function of the variation of the audio descriptor.

Preferentially, the audio descriptors are chosen from among the:
overall sound level of the document,
the acoustic environment,
sound level of each audio channel,
temporal variation of the sound level,
spatio-temporal variation of the sound level, and any combination of these components.

Preferentially, when the sound level of each audio channel and the overall sound level are used as an audio descriptor,
The gain of each audio channel is calculated (E3) as a function of the sound level and of the sound level of all the channels,
Advantageously,
A weighting window is determined for each pixel having a visual salience greater than a predetermined level, referred to as a visually salient pixel,
The spatial position of the position of the visually salient pixel is determined in the picture, A weighting function of each channel is calculated for each visually salient pixel as a function of the gain of each audio channel and of the spatial position of the pixel within the picture.

According to a preferred embodiment,
a weighting function is calculated for each channel and for each pixel of the picture as a function of its spatial position in the picture and of the value of the gain of the audio channel.

Preferentially, the weighting function of each channel is a linear function such that the pixels located on the channel side have a greater weighting than the pixels located spatially distant from the channel.

When the audio is of the stereo type, advantageously, the pixels located to the left of the picture will have a greater weighting for the weighting function of the left-hand channel and a lower weighting for the pixels located to the right of the picture.

According to a preferred embodiment,
the salience map is multiplied relative to the video part by the plurality of weighting functions, to obtain a plurality of salience maps,
the audio video salience map is obtained by averaging said salience maps.

Preferentially, the salience map is weighted by a coefficient dependent on the temporal variation of the sound level.

The invention also relates to a device for determining the salience map of an audio video document. According to the invention, the device comprises means for:
calculating a salience map in relation to the video part of said document,
determining at least one audio descriptor representing the document,
weighting the video salience map as a function of the variation of the audio descriptor.

BRIEF DESCRIPTION OF THE DRAWINGS

The invention will be better understood and illustrated by means of embodiments and implementations, by no means limiting, with reference to the annexed figures, wherein:
FIGS. 4a and 4b show respectively, for the right-hand and left-hand channel, a first variation example of the weighting functions in the case of stereo,
FIGS. 5a and 5b show respectively, for the right-hand and left-hand channel, a second variation example of the weighting functions in the case of stereo,
FIGS. 6a and 6b show respectively, for the right-hand and left-hand channel, a third variation example of the weighting functions in the case of stereo.

DETAILED DESCRIPTION OF PREFERRED EMBODIMENTS

The modules shown are functional units that may or may not correspond to physically distinguishable units. For example, these modules or some of them can be grouped together in a single component, or constitute functions of the same software. On the contrary, some modules may be composed of separate physical entities.

Figure 1:
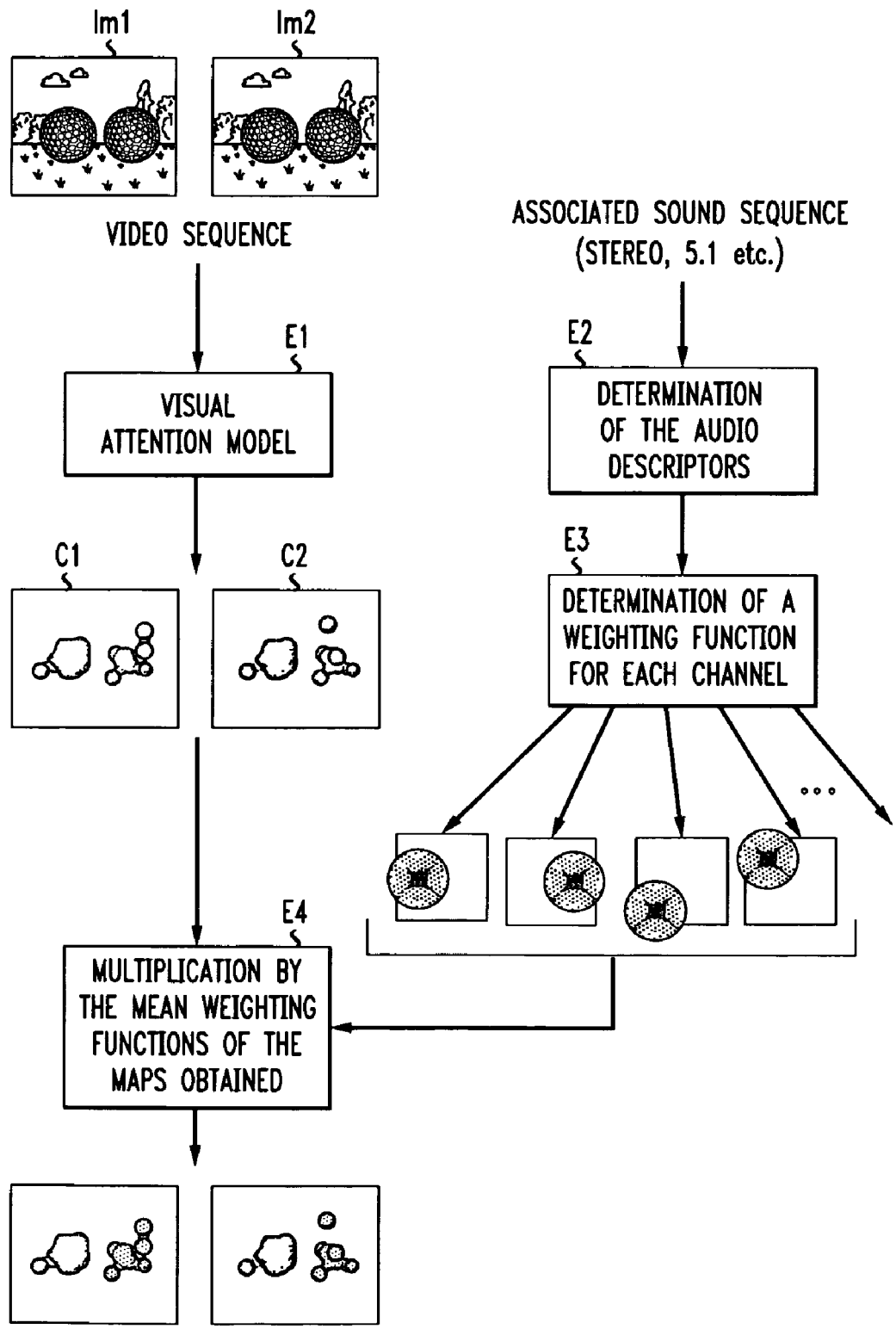
FIG. 1 shows an embodiment of the invention and effects of the invention applied to an audio video document.

FIG. 1 shows an embodiment of a preferred mode of the invention applied to a video sequence showing one golf ball talking with another golf ball.

In step E1, the salience map is determined by a video document from a visual attention model. A salience map is thus obtained as determined in the views C1 and C2 respectively for each picture Im1 and Im2. It is then observed that on the two salience maps C1 and C2 obtained, the salience associated with each ball is very similar. Indeed, the two balls have very similar characteristics, however, the sound associated with these balls are very different. Indeed, the right-hand ball listens whereas the left-hand ball talks. The attention of a person who watches the audio video document naturally focuses on the left-hand ball. The salience maps C1 and C2 obtained are therefore not sufficiently representative of the audio video document.

Hence, during a step E2, audio descriptors representative of the audio content of the audio video document are determined.

Among these descriptors, descriptors from the audio tracks are determined:
  The sound level of each channel (CSL) (right (r), left (l), bottom (b), top (t), back right (rl), back left (bl), etc.),
  The overall sound level (OSL) (period of silence, period of activity), that is the overall sum of the sound levels of the CSL channels,
  The acoustic environment (AE),
  The temporal variation of the sound level (SLTV) (passage from silence to strong activity),
  The spatio-temporal variation of the sound level (SLSTV) (passage from left to right, etc.).

From these audio descriptors, a weighting function is determined during a step E3. This weighting function associates each pixel with a higher or lower weight depending on whether the salience is required to be emphasized or reduced. This function therefore has a support having the resolution of the picture as a dimension. By default, namely when no audio data is available, the weighting function is uniform, that is of the value "1" for the entire picture.

Taking into Account the Sound Level of Each Channel

If a stereo sound is available, there are two channels, one for each side of the picture. When editing the sound on the video, it is therefore possible to give more sound to the right-hand side than the left-hand side if the right-hand side is required to be emphasized, if for example a person who is on the right-hand side of the picture speaks whereas a person on the left-hand side does not speak.

Hence the sound is not necessarily overall for a picture but can be more local. With a stereo sound for example, the left can be distinguished from the right. With Dolby 5.1 sound, the left, right, front, back, etc. can be distinguished.

Each channel defines a weighting function having a gain dependent on its audio masking capacity. A low amplitude sound with respect to the others cannot be heard so the channel that carries this sound has a low gain. The weighting functions are preferentially gaussian of unit amplitude, noted $Gauss_\sigma$ ($\sigma$ represents the spatial extent of the gaussian envelope) having different gains.

Figure 2:
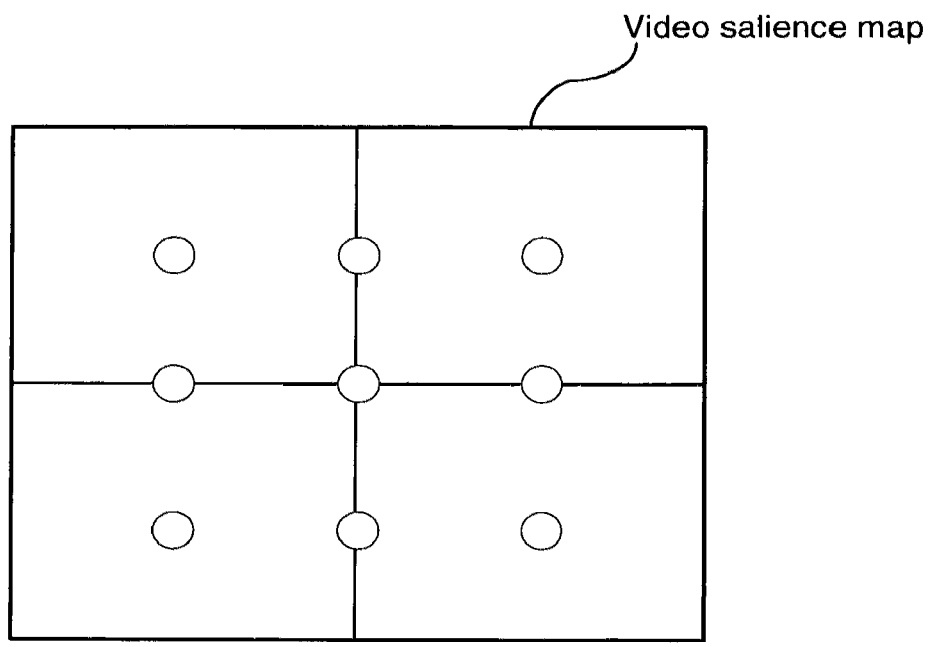
FIG. 2 shows an example of a centre of application of the weighting functions.

The centre of application of the weighting functions can be set for each channel by a predetermined grid. An example is given in FIG. 2 (where there are 6 channels for example as the points are then uniformly distributed on the picture).

This figure shows 9 points, the weighting functions have these nine points for their centre.

Figure 3:
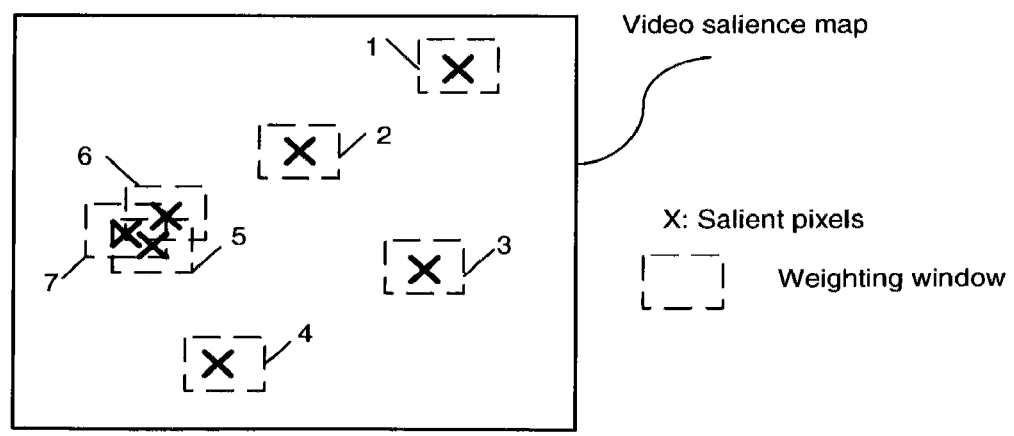
FIG. 3 represents a preferred embodiment showing, as centre of application, weighting functions, salient point of the video map with their associated weighting window.

The application centre of the weighting functions is preferably located on the salience maxima in each quadrant as shown in FIG. 3. Salient points are then used having a salience above a predetermined threshold where it is decided to conserve only a predefined number of salient points, or even following the location of the salient points, only one salient point is conserved when a reduced zone of the picture contains a majority of the salient points and that the picture contains several distributed salient zones.

In other embodiments, Laplace type functions can be used, represented by a square window centred on a point with a size, either fixed or variable.

The gain of each audio channel is given by the following equation:

$$GainWeight_i = \frac{CSL_i^p}{\varepsilon + \sum_j CSL_j^p}$$

$GainWeight_i$ showing the gain of the channel i and $CSL_i$ showing the sound level of the channel i.

P is an exponent, preferably of the value 2, $\varepsilon$ is a low value constant preventing division by zero. If the channels have the same sound level or a very close sound level, the gain associated with each channel is the same. However, the higher the sound level of a channel in comparison with the sound levels of the other channels, the higher its gain.

Each channel gain multiplies the gain of a previously defined weighting window, noted as Weight.

The amplitude of this weighting window depends on the gain of the channel.

$$GainWeight2_i = GainWeight_i * Weight$$

Hence, when the application centre of the weighting functions is located on the salience maxima, a weighting window around this maximum is defined as shown in FIG. 3. When in stereo mode, the position of the salience maxima is important for applying this weighting function. Indeed, for a salience maximum located to the right of the picture, it is important to apply to it the GainWeight value of the right-hand channel, and conversely for maxima located to the left of the picture, it is important to apply to it a GainWeight value of the left-hand channel. Hence, the distance of the salience maxima are calculated with respect to the edges of the picture. For the weighting function of the right-hand channel, a high GainWeight coefficient for the maxima located near the right-hand edge of the picture is applied and a low coefficient for the pixels located near the left-hand edge of the picture.

For the weighting function of the left-hand channel, a high GainWeight coefficient for the maxima located near the left-hand edge of the picture is applied and a low coefficient for the pixels located near the right-hand edge of the picture.

When the audio is not stereo but Dolby 5.1, then a distance is not calculated with respect to the edges of the picture but a position in the picture. According to this position, the influence of the channel on this point is determined.

To take distance into account, an additional weighting factor can be added to the previous equation $GainWeight2_i = GainWeight_i * Weight$.

The equation dependent on the notion of distant thus becomes $$GainWeight2_i = \alpha * GainWeight_i * Weight$$

α depends on the eccentricity with respect to the centre (xc,yc). Namely, the current point (x,y), alpha(x,y)=(x−xc)$^2$−(y−yc)$^2$. So, if (x,y)=(xc,yc), α tends toward zero, and otherwise alpha increases with the distance with respect to the centre.

FIGS. 4a to 7b show different embodiments of Gainweight2 in the case of a stereo sound, comprising a right-hand channel and a left-hand channel. These embodiments do not change only the salience of the maxima of the visual map as described above but change the salience of all the points of the picture.

FIG. 4a shows a first embodiment for the right-hand channel. GainWeight2d is maximum for the points located on the right of the picture and becomes equal to 1 for the central point and the points of the picture located to the left of the central point.

FIG. 4b shows a first embodiment for the left-hand channel. GainWeight2g is maximum for the points located on the left of the picture and becomes equal to 1 for the central point and the points of the picture located to the right of the central point. Weight thus represents a linear function.

This linear function is predefined, the variation being able to depend on the intensity of modulation required by the user.

In FIGS. 4a and 4b, it is also noted that the gain of the left-hand channel is greater than the gain of the right-hand channel. Hence, when multiplying by all the weighting functions, a more accentuated salience is obtained for the points to the left than for the points to the right.

FIGS. 5a and 5b show a logarithmic type decrease on the right and on the left.

FIG. 5b shows a second embodiment for the right-hand channel. GainWeight2d is maximum for the points located on the right of the picture and becomes equal to 1 for the central point and the points of the picture located to the left of the central point. Weight thus represents an increasing exponential function exp(x).

FIG. 5b shows a second embodiment for the left-hand channel. GainWeight2g is maximum for the points located on the left of the picture and becomes equal to 1 for the central point and the points of the picture located to the right of the central point. Weight thus represents a decreasing exponential function exp(x).

This increasing or decreasing exponential function is predefined, the variation being able to depend on the intensity of modulation required by the user.

FIG. 6a shows a third embodiment for the right-hand channel. GainWeight2d is maximum for the points located on the right of the picture and remain constant for a zone of the picture to the right of the centre, and for example located in the right-hand quarter or the picture. It has the value "1" otherwise.

FIG. 6b shows a third embodiment for the left-hand channel. GainWeight2d is maximum for the points located on the left of the picture and remain constant for a zone of the picture to the left of the centre, and for example located in the left-hand quarter or the picture. It has the value "1" otherwise.

This function is predefined, the variation being able to depend on the intensity of modulation required by the user.

Figure 7A:
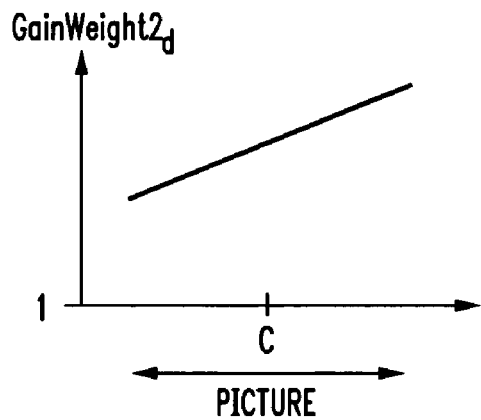
FIGS. 7a and 7b show respectively, for the right-hand and left-hand channel, a fourth variation example of the weighting functions in the case of stereo.

FIG. 7a shows a fourth embodiment for the right-hand channel. GainWeight2d is maximum for the points located on the right of the picture and decreases linearly up to the left of the picture.

Figure 7B:
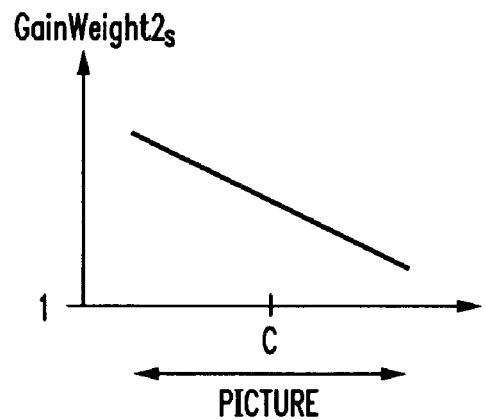
Figure 8:
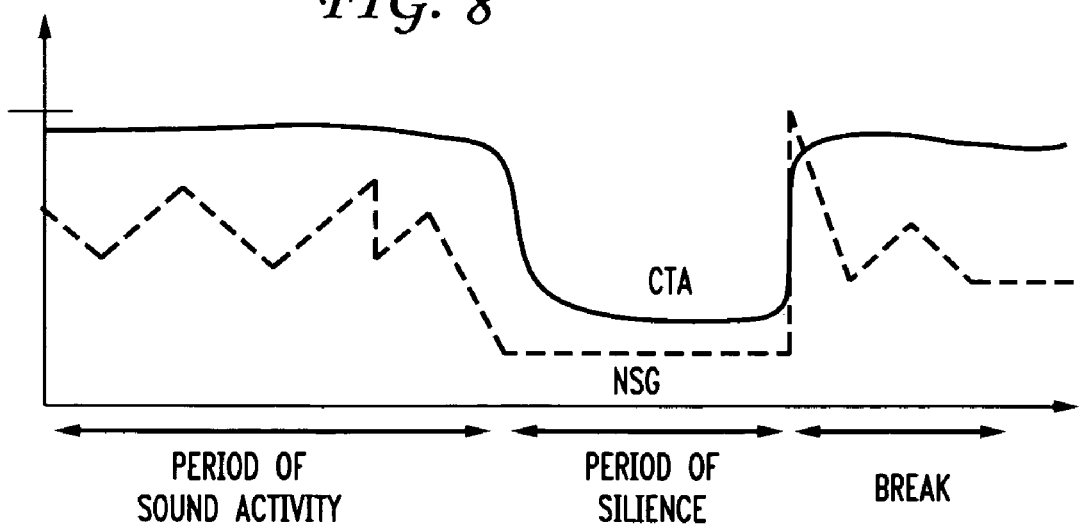
FIG. 8 shows the relationship between the overall sound level and the temporal attenuation coefficient.

FIG. 7b shows a fourth embodiment for the left-hand channel. GainWeight2g is maximum for the points located on the left of the picture and decreases linearly up to the right of the picture.

The slope of these two last curves is identical. The gain of the right-hand channel being greater than the gain of the left-hand channel, the points located on the right of the picture have a greater increase in their salience than the points located to the left of the picture. This function is predefined, the variation being able to depend on the intensity of modulation required by the user.

During a step E4, FIG. 1, the visual salience map is then multiplied by all the N weighting functions. The N maps obtained are then averaged to obtain an intermediate map SMMod.

Given SM the visual salience map,
Given SMMod the audiovisual salience map,
Given N sound channels,
Given Norm the scale factor,
The audiovisual salience map is then obtained from the following equation:

$$SM\,\text{Mod} = SM\left(1 + \sum_{i=0}^{N-1} GainWeight2_i^{NORM}\right), \text{ with } GainWeight2_i^{NORM},$$

the GainWeight2$_i$ value normalized by the sum of the values of the weighting window.

Taking into account the temporal variations of the sound levels.

During a step E5, the temporal variations of the sound level are taken into account.

When the sound level changes suddenly, and more particularly when the level goes from a low level to a high level, the visual attention increases, is high. Moreover, when passing to silence, the visual attention is certainly less strong.

It is therefore proposed to temporally apply a modulation coefficient of the salience, noted as TAC for temporal attenuation coefficient. FIG. 3 shows an example of change of the TAC coefficient as a function of the overall sound level.

The temporal attenuation coefficient TAC depends on the temporal variability of the value of the overall sound level OSL, integrated over a few seconds and its amplitude, also temporally averaged. This coefficient is applied uniformly to the salience map. By default, it is 1.

In other terms: during a period of silence, the salience is weighted by a coefficient tending toward 0, so as not to give priority to one zone over another.

$$SMMod2 = CTA \times SMMod$$

It is further noted that the invention as described in the different embodiments described previously tends to reduce the salience of the centre of the picture. However, it is sometimes important not to reduce this salience and rather to accentuate it.

By default, if the gains of the different channels are similar (the sound uniformly distributed between the channels), either nothing is done or the centre is accentuated by default.

The application described above is particularly applied in a context of a dialogue between 2 people. For a more general case, the centre of the picture remains a priority zone of attraction.

What is claimed is:
1. A method for determining the salience map of an audio video document comprising:
   calculating a salience map in relation to the video part of said document,
   determining at least one audio descriptor representing said document, weighting the video salience map as a function of the variation of said audio descriptor, wherein when the sound level of each audio channel and the overall sound level are used as an audio descriptor, the gain of each audio channel is calculated as a function of the sound level and of the sound level of all the channels, and wherein a weighting window is determined for each pixel having a visual salience greater than a predetermined level, referred to as a visually salient pixel, the spatial position of the position of said visually salient pixel is determined in the picture, a weighting function of each channel is calculated for each visually salient pixel as a function of the gain of each audio channel and of the spatial position of the pixel within the picture.

2. The method according to claim 1, wherein the audio descriptors are chosen from among the:

overall sound level of said document,
the acoustic environment,
sound level of each audio channel,
temporal variation of the sound level,
spatio-temporal variation of the sound level, and any combination of these components.

3. The method according to claim 1, wherein a weighting function is calculated for each channel and for each pixel of the picture as a function of its spatial position in the picture and of the value of the gain of said audio channel.

4. The method according to claim 3, wherein said weighting function of each channel is a linear function such that the pixels located on the channel side have a greater weighting than the pixels located spatially distant from said channel.

5. The method according to claim 4, wherein when the audio is of the stereo type, the pixels located to the left of the picture will have a greater weighting for the weighting function of the left-hand channel and a lower weighting for the pixels located to the right of the picture.

6. The method according to claim 1, wherein the salience map is multiplied relative to the video part by the plurality of weighting functions, to obtain a plurality of salience maps, said audio video salience map is obtained by averaging said salience maps.

7. The method according to claim 3, wherein the salience map is weighted by a coefficient dependent on the temporal variation of the sound level.

8. A device for determining the salience map of an audio video document comprising:

means for calculating a salience map in relation to the video part of said document, means for determining at least one audio descriptor representing said document, means for weighting said video salience map as a function of the variation of said audio descriptor, means for calculating the gain of each audio channel as a function of the sound level and of the sound level of all the channels when the sound level of each audio channel and the overall sound level are used as an audio descriptor and means for determining a weighting window for each pixel having a visual salience greater than a predetermined level, referred to as a visually salient pixel, means for determining the spatial position of said visually salient pixel in the picture, means for calculating a weighting function of each channel for each visually salient pixel as a function of the gain of each audio channel and of the spatial position of the pixel within the picture.

\* \* \* \* \*